(No Model.)
C. G. MILLER.
EXERCISING MACHINE.
No. 481,730. Patented Aug. 30, 1892.
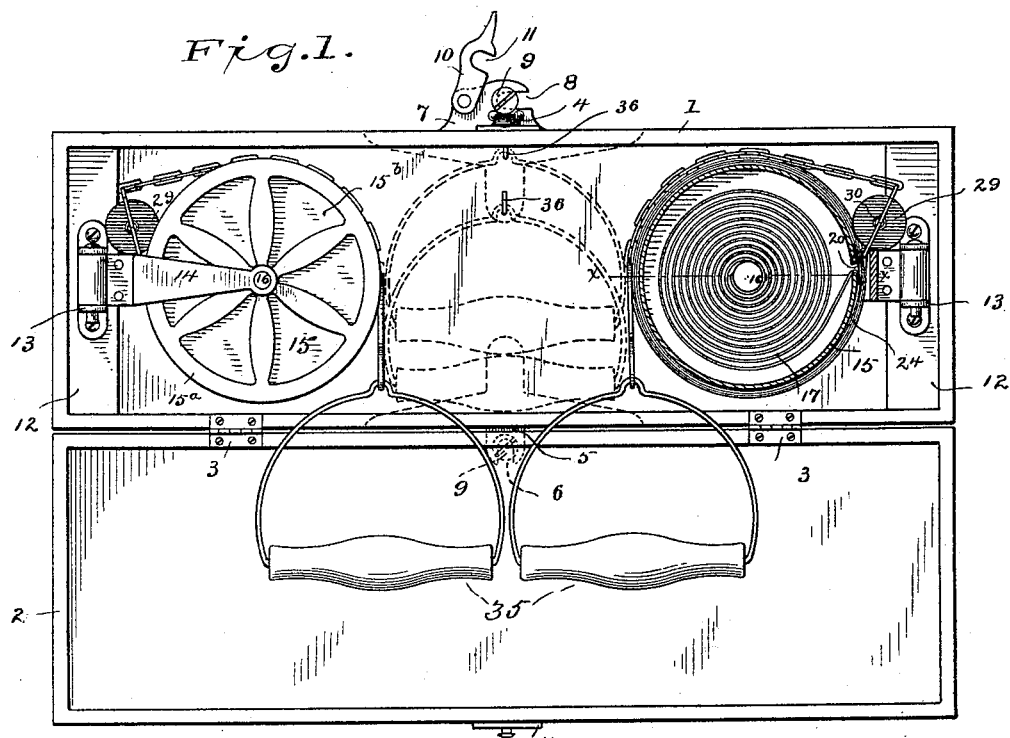
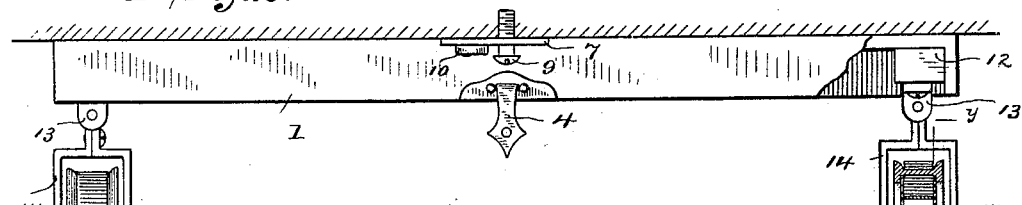
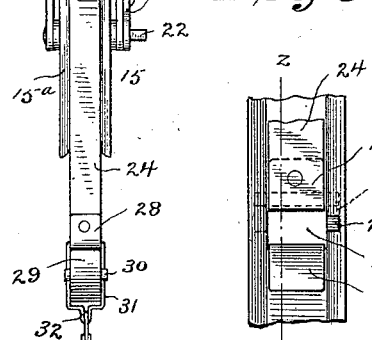
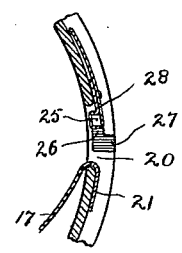
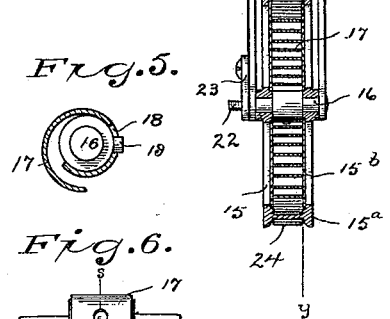
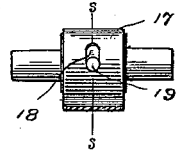
WITNESSES
H. A. Lamb
Clara J. Tuttle
INVENTOR
Charles G. Miller
By A. M. Wooster
Atty.

UNITED STATES PATENT OFFICE.

CHARLES G. MILLER, OF WATERBURY, CONNECTICUT.

EXERCISING-MACHINE.

SPECIFICATION forming part of Letters Patent No. 481,730, dated August 30, 1892.

Application filed April 22, 1892. Serial No. 430,171. (No model.)

*To all whom it may concern:*

Be it known that I, CHARLES G. MILLER, a citizen of the United States, residing at Waterbury, in the county of Fairfield and State of Connecticut, have invented certain new and useful Improvements in Exercising-Machines; and I do hereby declare the following to be a full, clear, and exact description of the invention, such as will enable others skilled in the art to which it appertains to make and use the same.

My invention has for its object to produce an exercising-machine which shall be so compact as to permit of its being readily inclosed in a small case, which may be readily attached to or detached from a wall, so as to permit of its being placed at the height of the shoulder or near the floor, and which may be readily carried about and attached at different places.

It has been a serious objection to exercising-machines and chest-weights as heretofore constructed that they were difficult to attach in place, were so unsightly as to be a serious objection in a well-furnished room, and that if the features of a chest-machine and a leg-machine were combined the machine was so complicated and required so much room as to practically prevent its use in families. In order to obviate all of these objections and to provide a simple, inexpensive, compact, portable, and ornamental machine, I have devised the simple and novel construction which I will now describe, referring by numbers to the accompanying drawings, forming part of this specification, in which—

Figure 1 is an elevation of my novel machine in position on a wall, the case being open and one of the drums shown in section on the line *y y* in Fig. 2; Fig. 2, a plan view showing the drums swung out as in use, one of the drums being in section on the line *x x* in Fig. 1; Fig. 3, a detail view on an enlarged scale, showing the connection of the spring and the band to the drum; Fig. 4, a section on the line *z z* in Fig. 3; Fig. 5, a detail view showing the connection of the inner end of spring on the shaft, the spring being in section on the line *s s* in Fig. 6; and Fig. 6 is an elevation of the shaft, the first coil of the spring being in section.

1 denotes the case, which is provided with a lid 2, hinged at the bottom, as at 3, and closed at the top by a suitable two-part catch 4. At the back of the bottom of the case at the center is a plate 5, (see dotted lines, Fig. 1,) a portion of which extends below the case and is provided with a vertical slot 6, and at the top of the back of the case at the center is a plate 7, a portion of which extends above the case and is provided with a horizontal or slightly-curved slot 8. The case is attached to the wall by means of two screws 9, both of which are of course provided with suitable heads. In attaching, slot 6 at the lower end of plate 5 is placed in engagement with the lower screw and the slot in plate 8 in engagement with the upper screw. A latch 10, pivoted to plate 7 and provided with a slot 11, is then closed down upon the upper screw, the slot in the latch being then likewise in engagement with the screw. The case is thus held firmly against movement in any direction, the lower screw being turned in just far enough to permit the engagement of plate 5 back of the head and the upper screw being turned in just far enough to permit the engagement of plate 7 and the latch back of the head. It will be seen that to remove the case it is simply necessary to lift the latch, move the top of the case slightly toward the left, as shown in Fig. 1, disengaging it from the upper screw and then lift it slightly, thereby removing it from the lower screw.

Should it be desired to use the machine for exercising the legs, or to give a rowing motion to a person sitting on a stool, or to give an upward chest pull when standing, it is simply necessary to attach the machine in place by screws placed in the base-board.

The entire machine may be removed at any time leaving only the two screws in the wall or base-boards.

Weights are entirely dispensed with and in lieu thereof I use spring-power, which may be readily adjusted in the manner which I shall presently describe. At each end of the case and secured to a cross-piece 12, within the case, are pairs of ears 13, between which are pivoted yokes 14. In each yoke is pivoted a drum 15, which turns freely on a shaft 16, journaled in the arms of the yoke.

17 denotes a coil-spring lying within each drum. The inner end of each spring is provided with a slot 18, which engages a pin 19 in the shaft, thereby securing said inner end firmly in place. The outer end of the spring passes through a slot 20 in the edge of the drum, and is then provided with a hook 21, which engages the periphery of the drum at the end of the slot, as clearly shown in Figs. 1 and 4. The inner end of each shaft is provided with a squared portion 22, which is adapted to receive a key for the purpose of winding, said shaft being locked in position after winding by a latch 23, having a slot adapted to engage the squared portion of the shaft, as shown in Fig. 2.

24 denotes a steel band, the inner end of which is provided with a cross-piece 25, by which it is connected to the drum.

In practice the side pieces of the drum (indicated by 15$^a$) are provided on their inner sides with recesses 26, and on one side with a slot 27, extending from the outer edge inward to one of said recesses.

In attaching the band one end of the cross-piece is inserted through slot 20 into the closed recess 26, the other end of the band being inserted into the other recess through slot 27, as will be clearly understood from Figs. 3 and 4.

In use the steel band or strip is wound upon the periphery of the drum and at its outer end is provided with a loop 28.

29 is a rubber disk, through the center of which a tube 30 passes. The ends of this tube are notched to receive a holder 31, said holder being made of wire and passing through loop 28 at the end of the steel band.

In use the disks serve as stops and engage the tops of the yokes, as in Fig. 1, to stop the rotation of the drums when the steel bands have been wound thereon in the return movement.

At the front of the holder is an eye 32, which is engaged by a chain 33, and at the front end of the chain is a snap-hook 34, with which a handle 35 is engaged. The spring having once been adjusted to the required tension does not need to be disturbed in use.

When it is desired to close the case, the operator swings the yokes 14 into the case, as in Fig. 1, and hangs the handles upon hooks 36 in the back of the case, the position of the handles when hung up being indicated by dotted lines in Fig. 1. When in this position, the lid will close down upon the drums and handles, thus inclosing all of the operative parts of the device.

In use the operator unfastens the lid and lowers it, as in Fig. 1. He then swings the yokes and drums out, as in Fig. 2, and uses the machine precisely as ordinary chest-weights are used.

An important advantage of my improved construction is that it always gives to the operator a direct pull from the axis of the drum, the yokes swinging in or out, as may be required, to conform to the movements of the operator, so that it is impossible for the bands to run off from the drums.

In order to prevent the possibility of the spring rattling within the drum, I place pads 15$^b$ between the side pieces and the spring. These pads may be made of paper, felt, leather, or any suitable material, and act to render the device perfectly noiseless.

If leg exercise or a rowing movement or an upward chest pull is required, the machine is attached to the base-board, as already described.

Having thus described my invention, I claim—

1. In an exercising-machine, the combination, with the operative parts of the machine, of a portable case within which the operative parts are inclosed and which is provided with slotted plates 5 and 7 and a latch 10, by which it is secured to the wall.

2. The combination, with a swinging yoke, a spring-actuated drum pivoted therein, and a band attached to said drum and coiled thereon, of a rubber disk having a tube 30 extending through it, said tube being slotted at its ends, a holder 31 engaging the band and the slots in the tube, a chain connected to the holder, and a handle connected to the chain.

3. The combination, with a swinging yoke and a spring-actuated drum pivoted therein, said drum having recesses 26 in its side pieces and a slot 27 in one of said side pieces, of a band 24, having a cross-piece 25, adapted to engage recesses 26, substantially as described.

4. The combination, with the swinging yoke, the shaft, and the drum, of a spring connected to the shaft and the drum, and pads between said spring and the side pieces of the drum, whereby rattling is prevented.

In testimony whereof I affix my signature in presence of two witnesses.

CHARLES G. MILLER.

Witnesses:
　GEO. W. ROBERTS,
　RALPH P. WEDGE.